United States Patent [19]

Phillips

[11] 4,318,725
[45] Mar. 9, 1982

[54] APPARATUS FOR DISCHARGING A FLOW OF GASES

[75] Inventor: John D. Phillips, Newark, Ohio

[73] Assignee: Owens-Corning Fiberglas Corporation, Toledo, Ohio

[21] Appl. No.: 204,393

[22] Filed: Nov. 6, 1980

[51] Int. Cl.$^3$ ............................................. C03B 37/04
[52] U.S. Cl. ........................................... 65/16; 65/14; 264/8; 264/12; 425/7; 425/8
[58] Field of Search ................... 65/6, 14, 8, 7, 15; 264/8, 12; 425/7, 8

[56] References Cited

U.S. PATENT DOCUMENTS 3,865,566  2/1975  Kleist ................................ 65/14 X
4,246,017  1/1981  Phillips ................................. 65/14

FOREIGN PATENT DOCUMENTS 699977  12/1964  Canada .................................. 65/14
972326   1/1951  France ................................... 65/16
40-8052  4/1965  Japan .................................... 65/14

Primary Examiner—Robert L. Lindsay, Jr.
Attorney, Agent, or Firm—Ronald C. Hudgens; Philip R. Cloutier; Ted C. Gillespie

[57] ABSTRACT

A blower for discharging a gaseous flow to attenuate molten mineral material into mineral fibers comprises a body member and a lid member defining a gas supply manifold and a gas discharge slot, and a screw having lower and upper threaded portions to engage the body member and lid member, respectively, the screw being adapted to raise and lower the lid member to control the size of the gas discharge slot.

12 Claims, 5 Drawing Figures

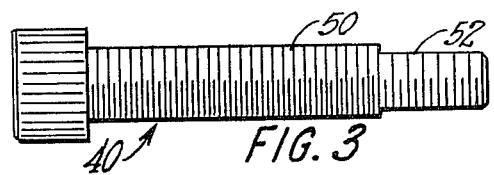
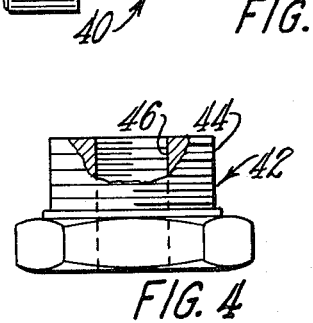
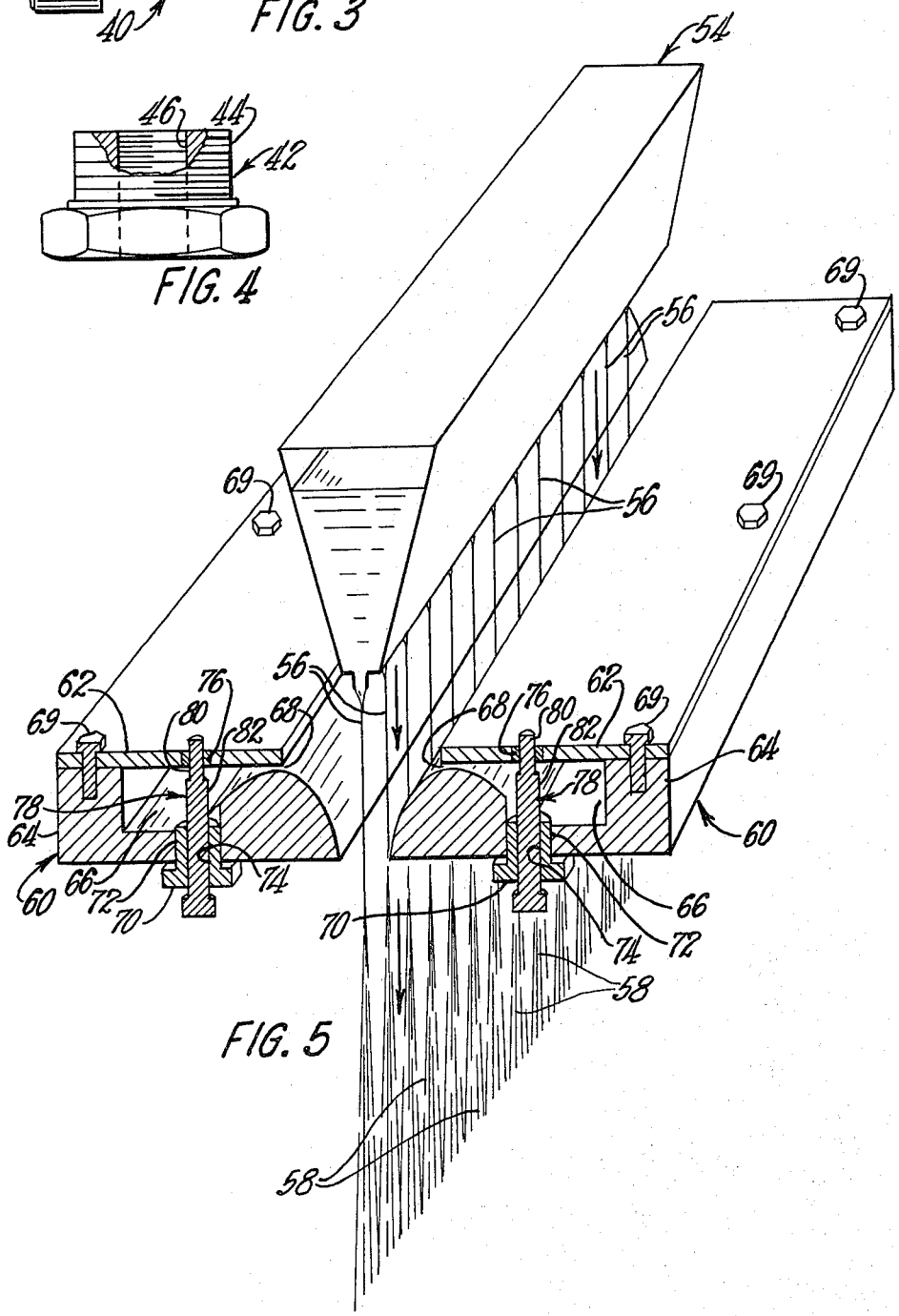

APPARATUS FOR DISCHARGING A FLOW OF GASES

TECHNICAL FIELD

This invention relates to apparatus for discharging a flow of gases and, in particular, blowers for discharging gases suitable for attenuating molten mineral material into mineral fibers. In one of its more specific aspects, this invention relates to apparatus for adjusting the width of a blower gas discharge slot defined by a body member and a lid member.

BACKGROUND OF THE INVENTION

A common practice in forming fibers of mineral material is to pass the material in a molten state through the orifices of the peripheral wall of a centrifuge or spinner to create primary fibers. Thereafter, the primary fibers are further attenuated into a veil of secondary fibers of smaller diameter by the action of a flow of gases discharged downwardly from an annular blower. It is known that such blowers can be adapted with a Coanda surface and can be adapted to blow air, steam or other gases. The Coanda blowers of the prior art are commonly comprised of a concave body member and a cantilevered lid member mounted to the body member, where the free end of the cantilevered member is close to the Coanda surface on the body member to define a narrow slot for the discharge of gases from the blower.

One of the problems associated with the blowers of the fiber-forming devices of the prior art is that it is difficult to accurately control the width of the slot in the high temperature environment in which the blower must operate. The high operating temperatures have a tendency to deform the cantilevered lid member, thereby modifying the size and the shape of the slot and resulting in non-uniform secondary attenuation of the fibers.

One prior art solution to the problem involves the use of shims inserted into the slot to maintain a minimum slot size in the event the free end of the cantilevered lid member becomes deformed toward the body member. The use of such shims has been found to be unsatisfactory because no control is provided in cases where the deformation of the cantilevered lid member raises the free end away from the lid member. The shims have also been found to be unacceptable because of the maintenance burden and the difficulty of adjusting the slot size with the shims. There is a need for a blower having a slot adjustment mechanism which is readily adjustable and easily cleanable, and which can provide accurate control of the blower slot during operation in a high temperature environment. There is also a need for a blower having a positive slot adjustment, enabling precise and controlled movement in either the upward or downward directions.

SUMMARY OF THE INVENTION

According to this invention, there is provided a blower having a body member and a lid member defining a gas supply manifold and a gas discharge slot, the improvement comprising a first threaded section positioned in the body member, a second threaded section positioned in the lid member, and a screw member adapted to raise and lower the lid member to control the size of the gas discharge slot, where the screw member has lower and upper threaded portions with the lower threaded portion engaging the first threaded section and the upper threaded portion engaging the second threaded section, and where the threads of the lower threaded portion have a pitch unlike the pitch of the threads of the upper threaded portion. The fact that the pitch of the lower threaded portion is unlike the pitch of the upper threaded portion results in relative movement of the lid member from the body member upon the turning of the screw member, since the screw member is positively engaged with both the body member and the lid member.

In one embodiment of the invention, the body member and the lid member are annular, and the size of the gas discharge slot is controlled with a plurality of the screw members.

In another embodiment of the invention, the body member and the lid member define a straight line slot which is controlled with a plurality of the screw members.

In a preferred embodiment of the invention, the first threaded section comprises a threaded insert having external threads engaging the body member and internal threads engaged by the lower threaded portion, where the external threads have the same pitch as the pitch of the threads of the upper threaded portion. The threaded insert of the invention enables positive engagement of the upper threaded portion with the second threaded section in the lid member during assembly.

In an additional embodiment of the invention, the threads of the lower and upper threaded portions and of the threaded insert are all of the same hand.

According to this invention, there is also provided a blower for attenuating molten mineral material into mineral fibers where the blower comprises a concave annular body member and a cantilevered annular lid member defining an annular gas supply manifold and an annular gas discharge slot, the improvement comprising a plurality of threaded inserts positioned in the body member, a plurality of first threaded sections positioned within the threaded inserts, a plurality of second threaded sections positioned in the lid member, and a plurality of screws adapted to raise and lower the lid member to control the size of the gas discharge slot, where the screws have lower and upper threaded portions with the lower threaded portions engaging the first threaded sections and the upper threaded portions engaging the second threaded sections, where the threads of the lower threaded portions have a pitch unlike the pitch of the threads of the upper threaded portions, and where the threaded inserts have external threads having the same pitch as the threads of the upper threaded portions.

In a preferred embodiment of the invention, the upper threaded portions of the screws contain about 20 threads per inch and the lower threaded portions contain about 24 threads per inch.

In another preferred embodiment of the invention, the lid member is movable upwardly at about 0.006 inch per revolution of the screws.

DESCRIPTION OF THE DRAWINGS

FIG. 3 is a schematic view in elevation of a screw member of the invention.

FIG. 4 is a schematic view in elevation of a threaded insert of the invention.

FIG. 5 is a schematic perspective view of a straight line embodiment of the blower according to the principles of this invention.

DESCRIPTION OF THE INVENTION

Figure 1:
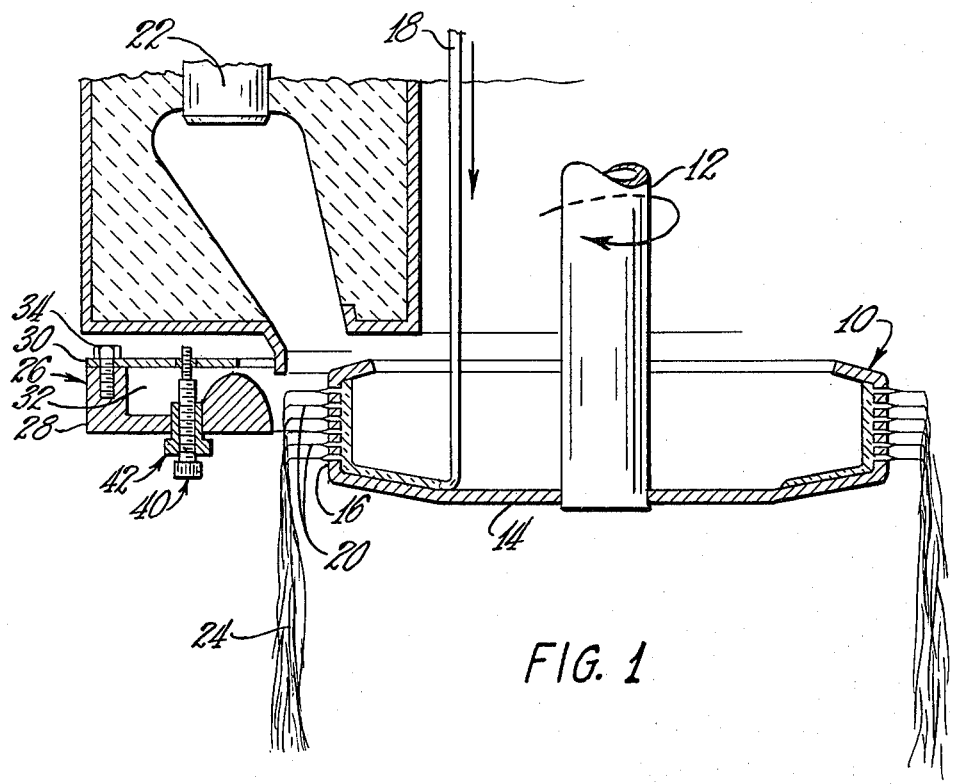
FIG. 1 is a schematic view in elevation of apparatus for attenuating molten mineral material into mineral fibers according to the principles of this invention.

As shown in FIG. 1, spinner 10 is mounted for rotation on quill 12 and is comprised of spinner bottom wall 14 and orificed peripheral wall 16. Molten glass stream 18 drops into the bottom of the spinner and flows outwardly and upwardly to the orificed spinner peripheral wall through which the glass passes to form primary fibers 20. The primary fibers can be maintained in a plastic, attenuable condition by the heat supplied from burner 22. The primary fibers are further attenuated into secondary fibers 24 by the action of a flow of gases discharged from annular blower 26. The flow of gases discharged from the blower can be air, steam, or any suitable combination of gases.

Figure 2:
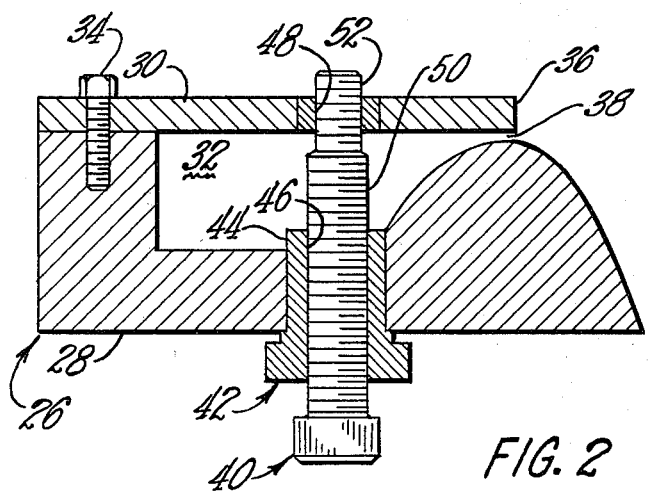
FIG. 2 is a schematic view in elevation of the blower of this invention.

The blower is comprised of body member 28 and lid member 30. The body member is concave and the lid member is mounted on the body member to define manifold 32 for the supply of gases. Gases are supplied to the manifold from a source not shown. The lid member is cantilevered so that one end is mounted to the body member with bolts 34, and free end 36 is positioned near the body member to define annular gas discharge slot 38, as shown in FIG. 2. The size of the gas discharge slot is controlled by relative movement of the free end of the lid member with respect to the body member. The movement of the free end of the lid member is controlled by the turning of a screw member, such as screw 40, as will be hereinafter described.

Mounted in the body member are one or more threaded inserts 42. As shown more clearly in FIG. 4, a threaded insert can contain external threads 44, adapted to engage the body member, and first threaded section 46 bored through the threaded insert and adapted to be engaged by the screw. The lid member contains one or more second threaded sections 48 which are adapted to be engaged by the screw.

As shown in FIG. 3, the screw contains lower threaded portion 50 and upper threaded portion 52. The first threaded section in the threaded insert is adapted to be engaged by the lower threaded portion of the screw, and the second threaded section in the lid member is adapted to be engaged by the upper threaded portion of the screw. The threads of the two portions of the screw are of unlike pitches. For example, the upper threaded portion can have a diameter of ¼ inch and have about 20 threads per inch. The lower threaded portion can have a diameter of about 5/16 inch and have about 24 threads per inch. In such a case, turning the screw will move the lid member up or down 0.006 inch per turn. The difference between the pitches of the upper and lower threaded portions causes relative movement between the lid member and the body member upon turning of the screw, and this relative movement enables control of the width of the gas discharge slot.

Preferably, the external threads of the threaded insert are of the same pitch as the upper threaded portion of the screw so that the screw and threaded insert can be simultaneously threaded into the lid member and body member, respectively, during assembly. The threads of the threaded insert and the upper and lower threaded portions should be of the same hand.

The embodiment shown in FIG. 5 illustrates that the blower slot adjustment can be accomplished in apparatus comprising a straight line blower and slot adapted to attenuate a straight line array of fibers. As shown, bushing 54 discharges primary fibers 56 which are further attenuated into secondary fibers 58 by blowers 60. The blowers are comprised of lid members 62 and body members 64 defining manifolds 66 and straight line slots 68. The lid members can be attached by bolts 69. Mounted in the body members are threaded inserts 70 having external threads 72 and first threaded sections 74 positioned therethrough. The lid member contains second threaded sections 76. Screws 78 contain upper threaded portions 80, which engage the second threaded sections, and lower threaded portions 82, which engage the first threaded section in the threaded inserts. The upper and lower threaded portions have pitches which are unlike, and therefore the turning of the screw provides relative movement between the lid member and the body member, resulting in adjustment of the slots.

INDUSTRIAL APPLICABILITY

This invention will be found to be useful in the formation of fibers from molten glass for such uses as glass fiber thermal insulation products and glass fiber acoustical insulation products.

I claim:

1. An apperatus for forming fibers from molten mineral material, including a blower comprising a body member and a lid member defining a gas supply manifold and a gas discharge slot, wherein the improvement comprises a first threaded section positioned in said body member, a second threaded section positioned in said lid member and a screw member adapted to raise and lower said lid member to control the size of said gas discharge slot, said screw member having lower and upper threaded portions, said lower threaded portion engaging said first threaded section and said upper threaded portion engaging said second threaded section, the threads of said lower threaded portion having a pitch unlike the pitch of the threads of said upper threaded portion.

2. The blower of claim 1 in which said body member and said lid member are annular, and further comprising a plurality of said screw members.

3. The blower of claim 1 in which said body member and said lid member define a straight line slot, and further comprising a plurality of said screw members.

4. An apparatus for forming fibers from molten mineral material, including a blower for attenuating said molten mineral material into mineral fibers comprising a body member and a cantilevered lid member defining a gas supply manifold and a gas discharge slot, wherein the improvement comprises a first threaded section positioned in said body member, a second threaded section positioned in said lid member and a screw member adapted to raise and lower said lid member to control the size of said gas discharge slot, said screw member having lower and upper threaded portions, said lower threaded portion engaging said first threaded section and said upper threaded portion engaging said second threaded section, the threads of said lower threaded portion having a pitch unlike the pitch of the threads of said upper threaded portion.

5. The blower of claim 4 in which said first threaded section comprises a threaded insert having internal threads engaged by said lower threaded portion and external threads engaging said body member, the external threads having the same pitch as the pitch of the threads of said upper threaded portion.

6. The blower of claim 5 in which the threads of said lower and upper threaded portions are of the same hand.

7. The blower of claim 6 in which said body member and said lid member are annular, defining an annular slot, and further comprising a plurality of said screw members.

8. The blower of claim 6 in which said body member and said lid member define a straight line slot, and further comprising a plurality of said screw members.

9. An apparatus for forming fibers from molten mineral materal, including a blower for attenuating said molten mineral material into mineral fibers comprising a concave annular body member and a cantilevered annular lid member defining an annular gas supply manifold and an annular gas discharge slot, wherein the improvement comprises a plutality of threaded inserts positioned in said body member, a plurality of first threaded sections positioned within said threaded inserts, a plurality of second threaded sections positioned in said lid member, and a plurality of screws adapted to raise and lower said lid member to control the size of said gas discharge slot, said screws having lower and upper threaded portions, said lower threaded portions engaging said first threaded sections and said upper threaded portions engaging said second threaded sections, the threads of said lower threaded portions having a pitch unlike the pitch of the threads of said upper threaded portions, and said threaded inserts having external threads having the same pitch as the threads of said upper threaded portions.

10. The blower of claim 9 in which the threads of said threaded inserts and said lower and upper threaded portions are all of the same hand.

11. The blower of claim 10 in which said upper threaded portions contain about 20 threads per inch and said lower threaded portions contain about 24 threads per inch.

12. The blower of claim 10 in which said lid member is moveable upwardly at about 0.006 inch per revolution of said screws.

* * * * *